United States Patent [19]
Uischner et al.

[11] Patent Number: 6,094,130
[45] Date of Patent: Jul. 25, 2000

[54] EMERGENCY POWER STATION FOR TRAFFIC CONTROL SIGNALS

[76] Inventors: Charles W. Uischner, 1030 Pine Meadow Ct., Martinez, Calif. 94553; Lyndon D. Palmer, 886 Hanlon Way, Benicia, Calif. 94510

[21] Appl. No.: 09/065,231

[22] Filed: Apr. 15, 1998

[51] Int. Cl.[7] .................................................... G08B 1/00
[52] U.S. Cl. .................. 340/333; 340/693.1; 340/693.2; 340/693.5; 340/907
[58] Field of Search .................................... 340/333, 907, 340/908, 635, 679, 691.1, 693.1, 693.2, 693.5; 322/25

[56] References Cited

U.S. PATENT DOCUMENTS

| | | | |
|---|---|---|---|
| 5,239,253 | 8/1993 | Shimizu et al. | 322/25 |
| 5,561,330 | 10/1996 | Crook | 290/30 R |

*Primary Examiner*—Daryl Pope
*Attorney, Agent, or Firm*—Richard Esty Peterson

[57] ABSTRACT

An emergency power station for traffic signal controllers having a general utility power supply, the emergency power station having a small footprint cabinet containing a fuel supply in a lowermost compartment, an engine and an electrical generator in a middle compartment, and a power station controller box in an uppermost compartment, the power station controller box having a power circuit connected to the utility power supply, the electrical power generator and the traffic signal controller, the power circuit including an activatable power switch selectively connecting the utility power supply or the power generator to the traffic signal controller, the power station controller box also including a control circuit with a power line monitor and a programmable timer system for sensing a power loss in the utility power supply, and, after a predetermined delay, activating the engine and switching the switch connecting the traffic signal controller to the power generator.

20 Claims, 5 Drawing Sheets

EMERGENCY POWER STATION FOR TRAFFIC CONTROL SIGNALS

BACKGROUND OF THE INVENTION

This invention relates to an emergency power station and in particular to a stand-by electrical power installation that is self-activated during a power outage. The stand-by power installation has particular application for traffic control signals where a power failure may have serious consequences. In such an environment, the power station is unattended and subject to the elements including potential vandalism. Therefore, a power station of this type must comprise a stand-alone unit that has a protective housing and occupies minimal space, particularly in the intended preferred use as an auxiliary power supply for traffic control signals.

In any traffic management system, it is often critical to maintain traffic control at certain intersections or locations in the event of a municipal power failure. Ordinarily, when a power failure occurs, a traffic officer may be dispatched to the location of the signal failure to maintain the orderly flow of traffic, until the municipal power is resumed, or, in the case of a back-up system, a portable power generator is brought to the scene and connected to the control signals.

In addition to the substantial use of man-power under emergency conditions that may be pervasive during a power outage, there is an unavoidable delay before orderly control can be established. During this time an accident may occur that may cause serious injury, or at the least, further add to the congestion that inevitably results from the operational failure of traffic control signals.

The advantage of a permanent, on-site, back-up power station is evident. However, to solve the problem of delay in attending to the outage, the emergency power station must be intelligent and able to activate itself when the power outage occurs, and deactivate when the primary power is resumed.

SUMMARY OF THE INVENTION

The emergency power station of this invention is an intelligent auxiliary power supply for an outdoor installation where a prompt supply of emergency power is required for traffic intersection controller backup.

The emergency power station of this invention includes an internal combustion engine coupled to a generator mounted in a frame over a fuel tank. Mounted in the frame above the engine is a control box that includes the power switching circuitry and the control circuity for sensing a utility power failure, activating the operation of the engine and switching the connected traffic control signals from electrical connection with the primary power source of the municipal or utility power network to electrical connection with the auxiliary power generated by the engine and generator.

The emergency power station of this invention is self-contained in a tamper-proof cabinet with the components arranged in a vertical stack to minimize the effective footprint of the plant.

Additionally, the emergency power station includes a control system allowing manual testing in different modes of operation and a programmable timer system to allow a predetermined delay to occur prior to switching from utility power to generator power and/or back from generator power to utility power.

DETAILED DESCRIPTION OF THE PREFERRED EMBODIMENTS

Figure 1:
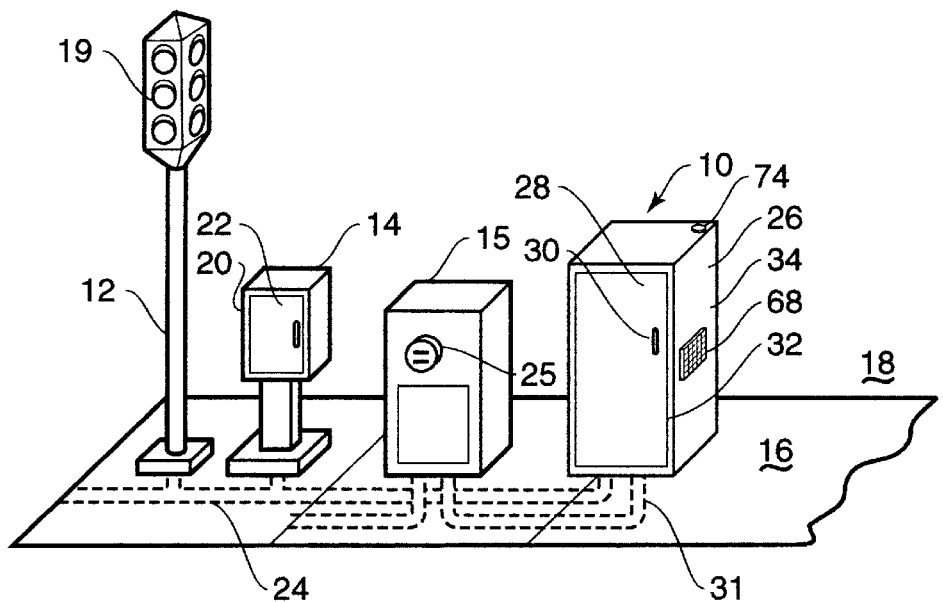
FIG. 1 is a perspective view of a typical traffic signal control system with the added emergency power station.

Referring to the perspective view of FIG. 1, the emergency power station for traffic control signals is designated generally by the reference numeral 10, and shown with a typical traffic control signal 12, a traffic signal controller in the form of a signal control box 14 and a utility meter pedestal 15. The traffic control signal 12 is representative of one of multiple control signals at a street intersection and is shown mounted on a sidewalk 16 next to a street 18.

The control box 14 is connected to the municipal or utility power source supplied to the utility pedestal 15 and regulates the timed operation of the intersection control lights 19 on a traffic control signal 12, one of which is shown in FIG. 1. Typically, the control box 14 includes a vandal-proof cabinet 20 with a locked access door 22 to restrict access to an internal control panel (not shown) to only authorized personnel. The signal control box 14 is electrically connected to the control signal 12 and other control signals serviced by the control box by underground wiring in a conduit 24 shown in dotted line. A meter 25 on the utility meter pedestal 15 records the power supplied to the signal control box 14 through the emergency power station 10 including any incidental power used in the power station 10.

The emergency power station 10 has a similar vandal-proof and rodent resistant cabinet 26 with a front access door 28 having a lock 30 to restrict access to authorized personnel. The emergency power station 10 is designed to be housed in a tall protective cabinet to maintain a relatively small footprint, since it is preferred that it occupy minimal space on a sidewalk or street island where it is intended to be located. Preferably, the power station 10 is electrically connected to the control box 14 and utility pedestal 15 by cables in underground conduit 24 and 31 shown in dotted line. Any above ground connection should be made using a protective grounded casing or conduit to prevent any uncontrolled discharge in the event of an accidental collision by a vehicle.

Figure 2:
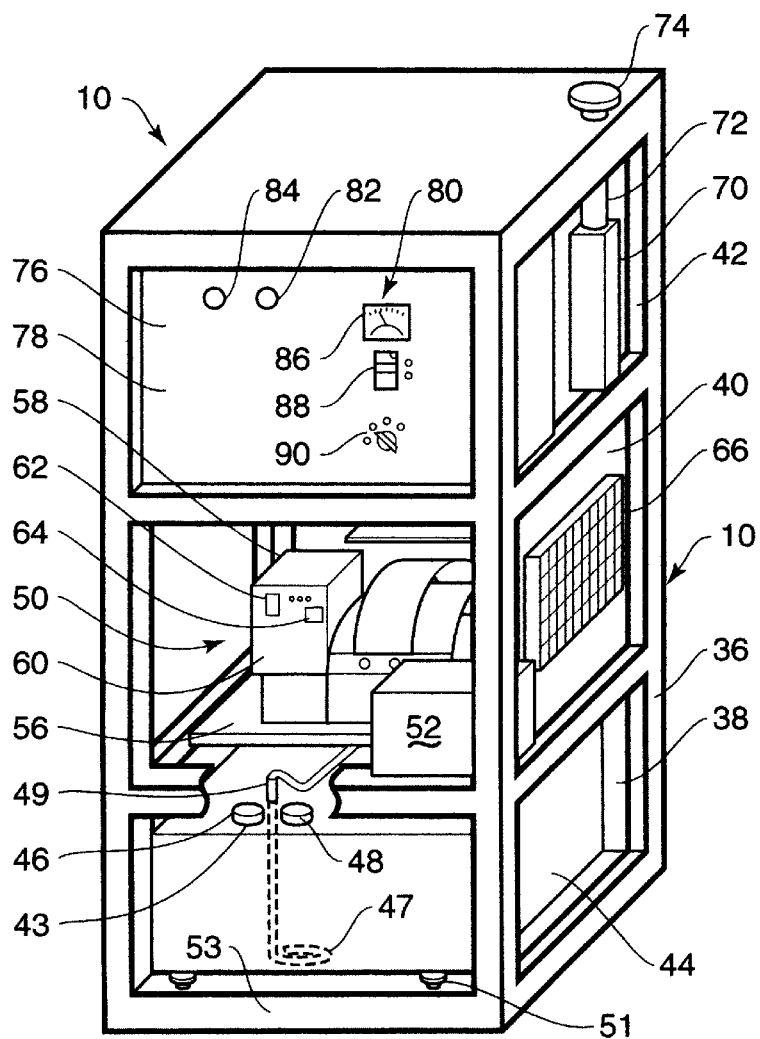
FIG. 2 is a perspective view of the emergency power station with cabinet panels removed showing an engine, a generator, a fuel tank and a power station controller box.

Referring also to FIG. 2, the emergency power station 10 is shown with front and side panels 32, 34 of the cabinet 26 removed to reveal the vertical, tiered arrangement of the components necessary to provide the small footprint required for intended use. The emergency power station has a frame 36 formed of box tube welded to provide three compartments 38, 40 and 42. The lowermost compartment 38 contains a rectangular fuel tank 44 with a fuel fill spout 43 and vent cap 46, a fuel gauge 48 for visual inspection of the fuel supply and a ½" threaded port 45 for a 120-V tank heater 49, shown in dotted line. The fuel fill spout 43 and vent cap 46 are located at the front of the cabinet 26 for convenient access when the cabinet door 28 is opened. The fuel tank 44 has tabs 51 bolted to the bottom cross members 53 of the frame 36. Locating the fuel tank at the bottom of the cabinet prevents a fuel spill from contaminating the other components and causing a potential fire.

Above the fuel tank is the compartment 40 that contains the thermal engine 50, engine battery 52 and auxiliary components related to engine operation. The engine is preferably a diesel engine, which uses the less volatile and safer diesel fuel instead of gasoline for operation. The diesel engine 50 shown, is a compact, Power Tech Model 1DL8000 with an integral oil pan 56. The engine 50 can develop 8 KW of power from a mechanically coupled generator 58. Depending on the power requirements of the installation, a larger or smaller engine/generator combination can be utilized. Additionally, other engine types can be substituted. For example, a natural gas engine with a natural gas or propane cylinder in the lowermost compartment is suitable for certain installations.

The engine battery 52 is located in front of the coupled diesel engine 50 for convenient removal and positioned to one side of the cabinet to allow clear access to the fill spout 43. The battery 52 is a conventional heavy duty, twelve-volt vehicle battery that provides the electrical power to start the engine and the basic d.c. power for the engine operating circuits. The generator 58 has a control panel 60 with a start switch 62 for manually starting the engine during testing or periodic service operations. The generator control panel 60 is an integral component of the engine/generator combination and includes a meter 64 for recording the hours of engine operation. The engine 50 has a cooling system with a radiator 66 situated at the side of the frame 36 and aligned with a protective grate 68 on the side panel 34 of the cabinet 26 for passing air into the cabinet, as shown in FIG. 1. Exhaust from the engine is discharged through a critical grade exhaust silencer 70 in the upper compartment 42 and through a vent pipe 72 with a hinged vent cap 74 at the top of the cabinet 26.

The upper compartment 42 of the frame 36 contains the power station controller box 76 with a door panel 78 providing the mount for the basic operating controls 80 for setting the mode of operation of the system. The power station controller box 76 is shown in FIG. 3 with the door panel 78 opened to show the internal components that control the switching from line power to emergency generator power.

The front of the door panel 78 has a red panel light 82 signaling that the load is connected to the emergency power station, and a green panel light 84 signaling that the load is connected to the normal line supply. Additionally, the front of the door panel has a voltmeter 86 and a voltmeter selector switch 88 for selecting polarity and voltage depending on the installation hookup. The selector switch 88 has an "off" position for deactivating the voltmeter 86. A generator control switch 90 has three static positions including "off", "auto", for automatic activation of the emergency power, and "test" for manual activation where the engine and system can be tested by a service operator. Twisting the switch 90 to a spring-loaded forth position and holding, will start the engine in the manner of an ignition switch. When released the switch returns to "test" with the engine running.

Figure 3:
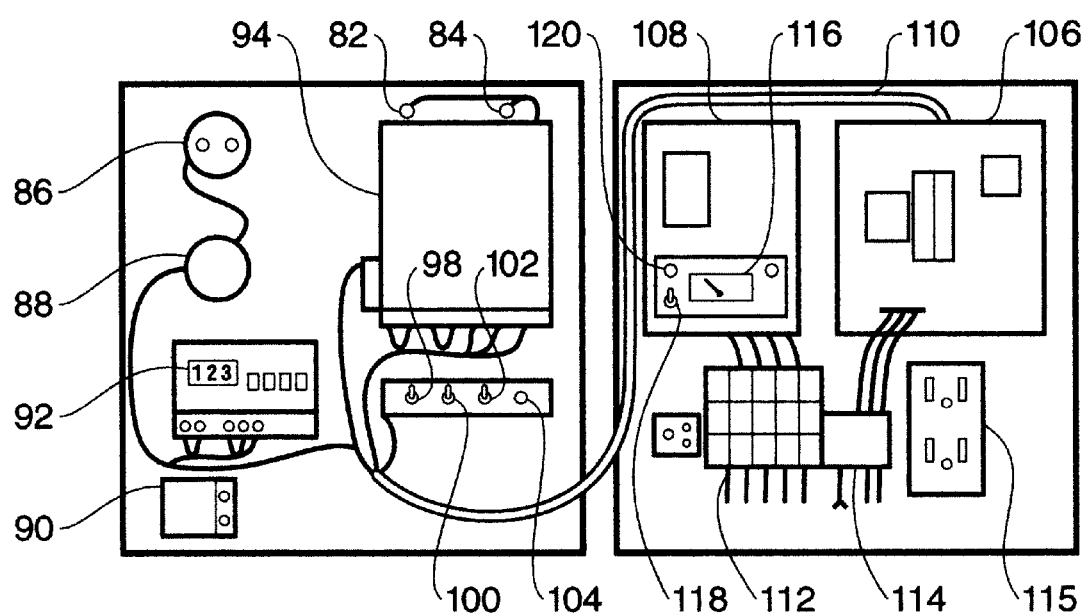
FIG. 3 is a partial front view of the power station controller box with the door of the box in an open position.

On the back of the door panel 78, as shown in FIG. 3, the described components are similarly numbered. Also mounted on the back or inside of the door panel 78 is a switch controller 94, which includes a programmable processor that allows a delay to be programmed from the cut-off of line voltage to the activation of emergency power and/or delaying the switch from emergency power back to normal line power.

This provides the option of delaying the change to emergency power where interruption of power may be temporary, avoiding an unnecessary start of the engine. Similarly, this prevents a premature shut down where the return of line power is momentary. A timer control 92 also provides a real time clock for programming periodic startup of the engine at pre-determined intervals to insure systems are at ready. Also mounted on the door panel 78 are the switch controller 94 and a switch plate 96 with three toggle switches 98, 100, 102 and one push button switch 104. The toggle switch 98 sets the exercise mode with load or without load. The toggle switch 100 sets the transfer mode with load or without load. The toggle switch 102 sets the inhibit transfer to normal as "on" or "off". The push button switch 104 effects the re-transfer to normal immediately on pushing.

In this manner, various options are available for testing and operation and depend on whether an operator is present. For example, pre-programmed periodic testing may be designed simply to exercise the engine without interfering with the normal line connection to the load. In such instance switch 98 would be set to exercise without load and switch 100 might also be set to transfer without load if the transfer protocol is to be tested without effecting an actual transfer. The inhibit transfer to normal may be set to "on" where resumption of line power is erratic. The push button switch 104 is used when an operator is confident that the line power has resumed and further interruption is unlikely, allowing a programmed delay in returning to line power to be overridden.

The controller box 76 in the emergency power station contains the transfer switch unit 106 which is mounted next to the battery charging unit 108. The transfer switch unit 106 includes a 100 AMP, two pole, power transfer switch 109 from ASCO and the auxiliary components needed to reversibly switch the load from line power to emergency power. Emergency power is generated by the activated engine and generator under control of the switch controller 94. The transfer switch unit 106 and the switch controller 94 are electrically interconnected by wires in a number of wire harnesses 110 with a bank of circuit breakers 112 interposed to protect the control circuitry from momentary overloads, and to allow disconnecting of protected loads for testing, servicing or replacement. Adjacent the bank of circuit breakers is a terminal rail 114 for routing the wiring, and an electrical outlet 115 for tapping power at the power station for use with auxiliary equipment.

The battery charging unit 108 includes a charge regulation circuit and a meter 116 with a switch 118 for activating the charging unit 108, meter 116 and indicator lights 120 for signaling that the charging unit is on. The battery charging unit 108 insures that the battery 52 maintains a full charge whether emergency power is activated or not. Power for charging is drawn from the municipal or utility line, or from the emergency generator 58 after starting the engine.

Figure 4:
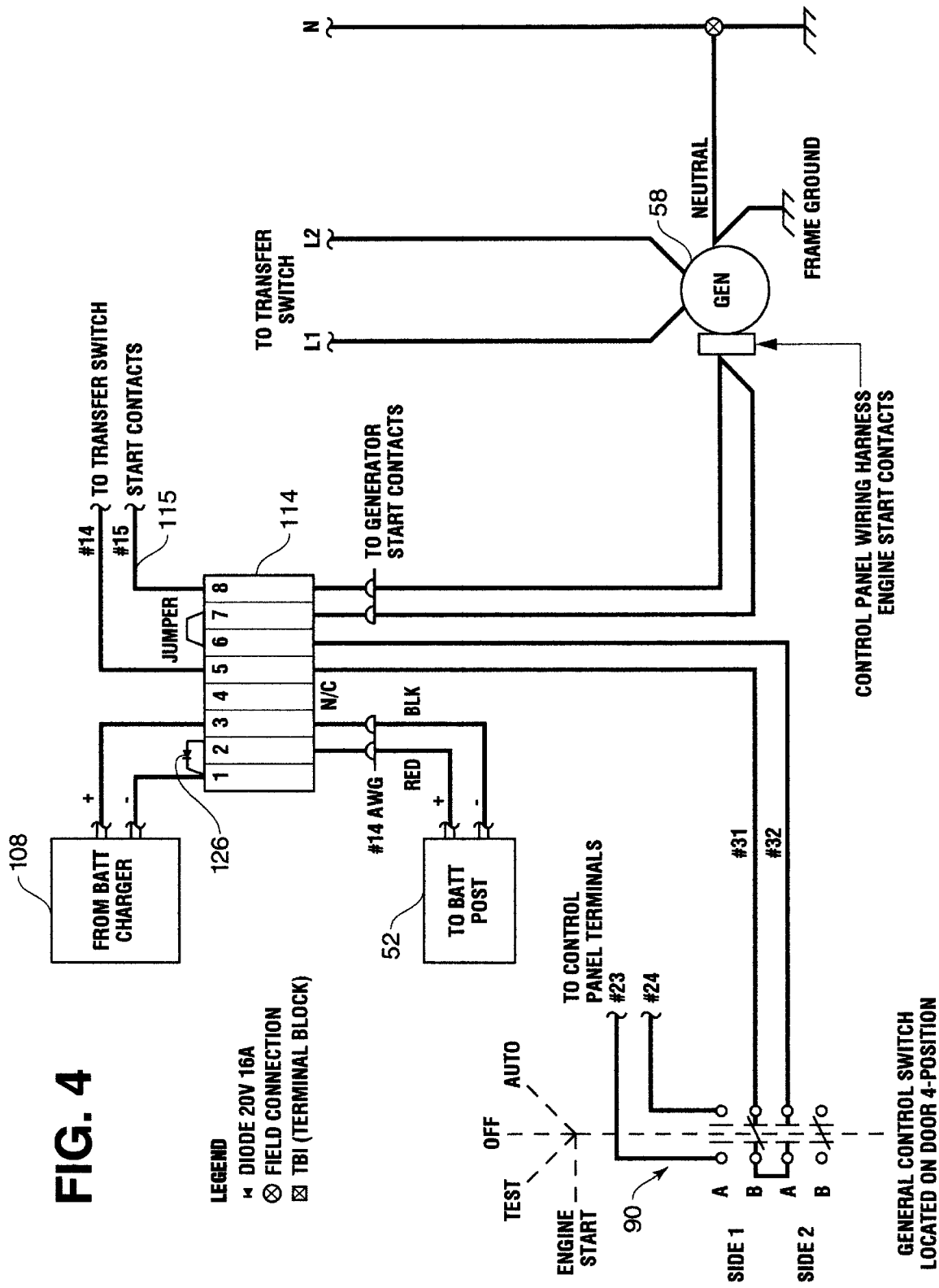
FIG. 4 is an electrical schematic of the generator control circuitry.
Figure 5:
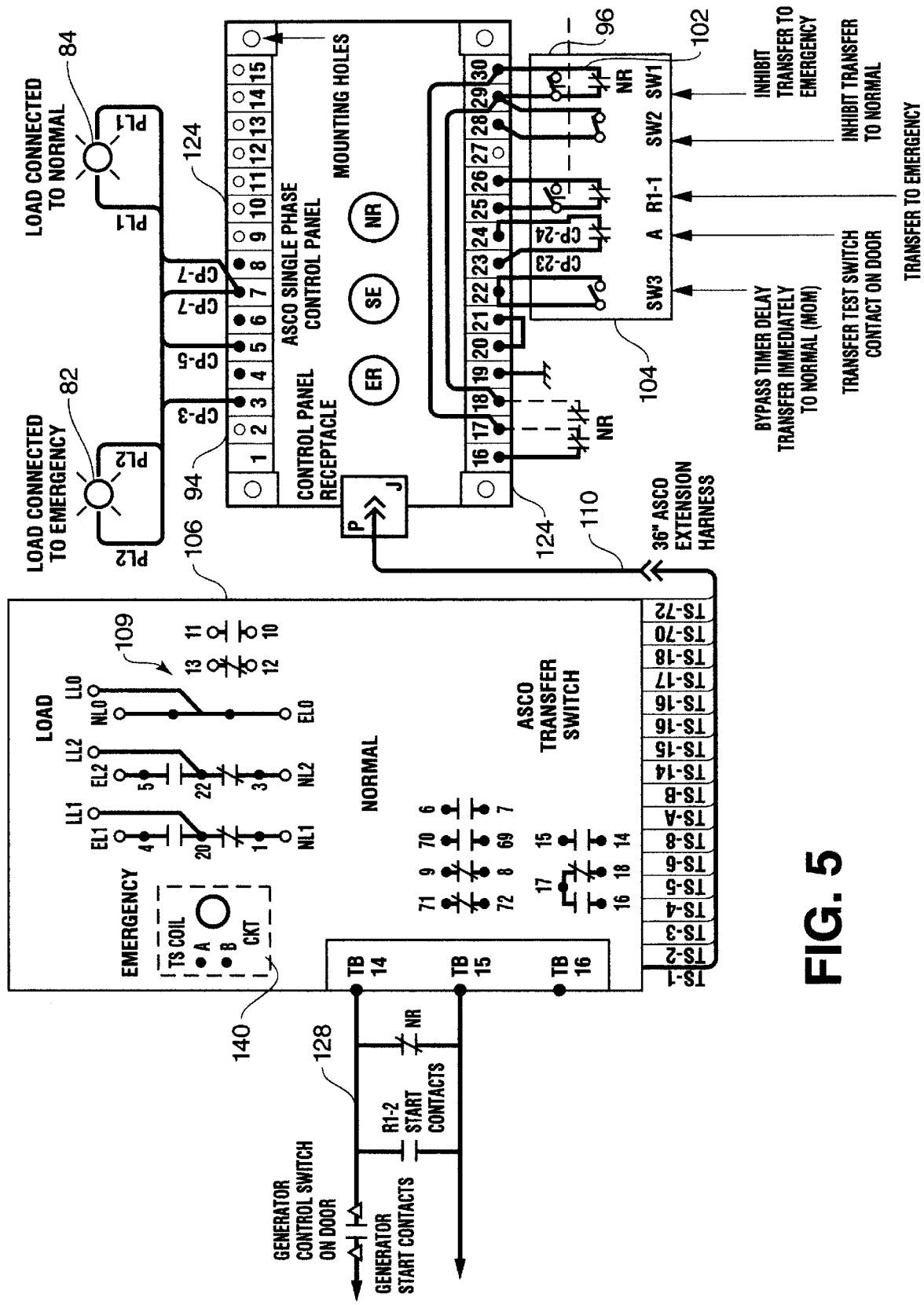
FIG. 5 is an electrical schematic of the power switch and control panel.
Figure 6:
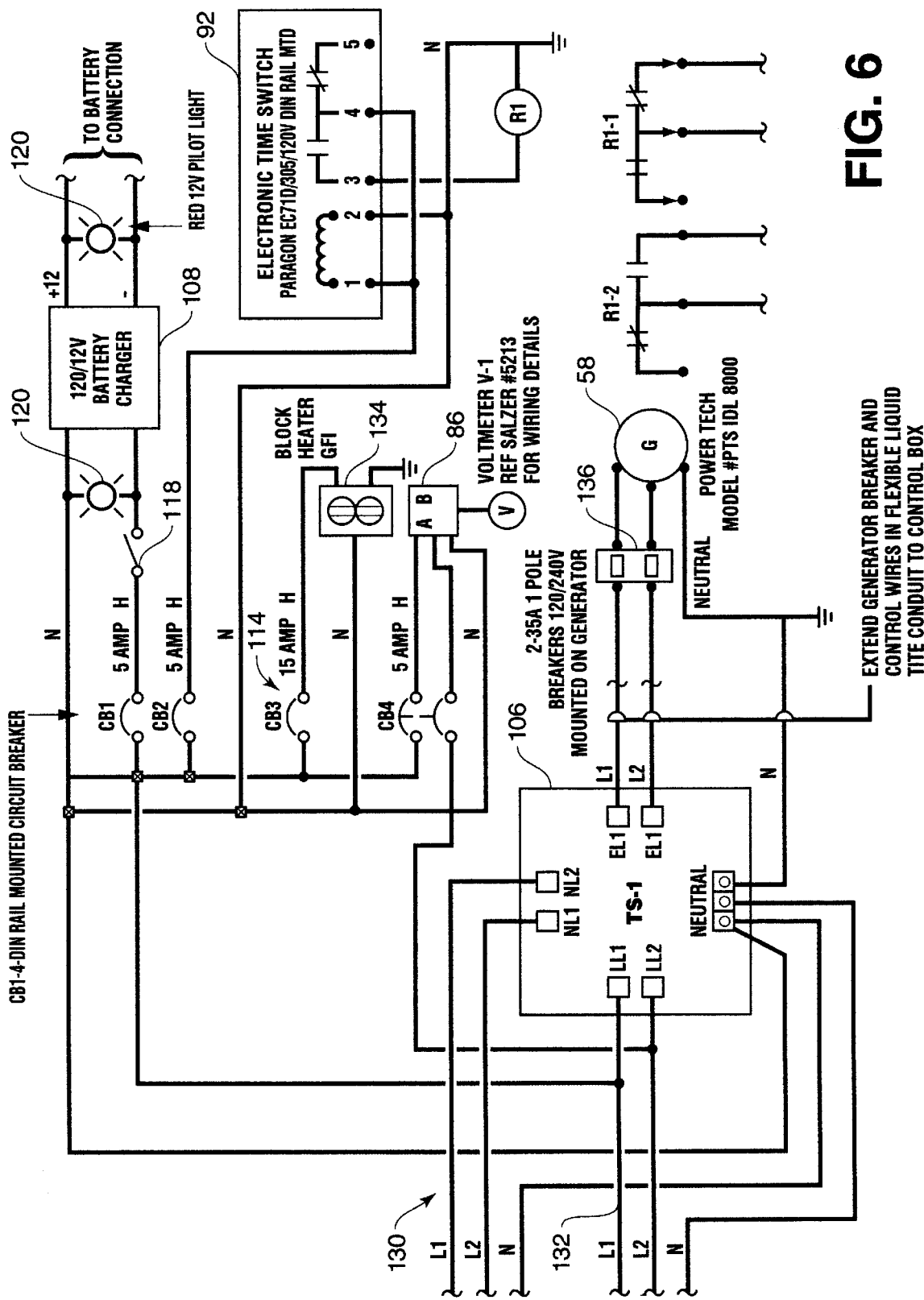
FIG. 6 is an electrical schematic of the engine control circuitry.

The electric circuit diagrams of FIGS. 4–6 detail the circuitry of the power system. Referring to FIG. 4, the generator 58 is schematically illustrated with output leads L1, L2 and N, which is grounded neutral. The output leads connect to the power transfer switch unit 106 for supplying power to a load such as the traffic signal 12 of FIG. 1 in the event of a line failure. The generator start contacts 113 are connected through the terminal rail 114 to the terminals 124 of the switch controller 94 shown in the wiring diagrams of FIGS. 5 and 6. The four position generator control switch 90 is interposed between the terminal rail 114 and the terminals 124 of the switch controller. The terminal rail 114 also connects the battery charger 108 to the battery 52 under protection of a diode 126.

Referring to FIG. 5, the transfer switch unit 106 is a component manufactured by ASCO, and is rated at 100 amps and is connected to the switch controller 94 by the harness 110 and the generator control switch by lines 128. The switch controller 94 is also manufactured by ASCO and includes the terminals 124 connecting the load indicator lights 82 and 84 on the door panel 78 of FIG. 2 and the toggle switches 98, 100 and 102 and push button switch 104 on the switch plate 96.

Referring to the power circuit schematic of FIG. 6, the transfer switch unit 106 connects to the utility power by lines 130 and to the load, for example the traffic signals, by lines 132. The circuit breakers 114 (CBI–CB4) protect the auxiliary components including the battery charging unit 108, the electronic timer control 92, the voltmeter 86 and a block heater 134 that maintains the engine 50 in condition for a cold start. The generator 58 has integral pole breakers 136 protecting the connection with the transfer switch unit 106.

The transfer switch unit 106 has a switch coil 140 that operates under control of internal circuitry in the switch controller 94 that senses power or the absence thereof in the utility line 132. Depending on the settings of the delay switches, the switch controller 94 immediately, or after a set delay, activates the switch coil 140 to switch the power switch 109 transferring the power supply from utility power to emergency power or vice versa.

In operation, the emergency power station 10 of this invention is designed for placement at a remote site for automatic start-up upon failure of the utility power. Because power interruption may be temporary, the power station of this invention includes the delay circuit that is programmable to set a desired time delay before start-up in the event of a momentary power failure. The set time delay can also be applied to the power station shut-down phase, so that a momentary utility power resumption will not cut the emergency power generation.

The unique vertical design of the power station provides a small footprint allowing the power station to be installed on a sidewalk or traffic island.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An emergency power station for traffic signal controllers powered by a conventional utility power supply, the emergency power station comprising:

a multicompartment support frame having a first lowermost compartment with a fuel supply container in the compartment mounted to the frame, a second middle compartment above the first compartment with an engine and an electrical power generator operably connected to the engine in the second compartment mounted to the frame, and, a third compartment with a power station controller box mounted to the frame, the controller box having a power circuit having a first line connectable to a supply of utility power, a second line connectable to a traffic signal controller, a third line connected to said generator, with an activatable power switch interposed between said second line and said first and third lines, and a control circuit automatically connecting one of said first and third lines with said second line, the control circuit including power monitoring means for sensing a power loss in said first line and activating the power switch to switch the second line from connection with said first line to connection with said third line.

2. The emergency power station of claim 1 wherein said control circuit monitoring means includes means for monitoring a return of utility power to said first line from a power loss in said first line, and activating the power switch to switch the second line from connection with said third line to connection with said third line.

3. The emergency power station of claim 1 wherein said control circuit includes an engine operation circuit connected to the engine and circuit means for automatically starting the engine after the power monitoring means senses a power loss in said first line.

4. The emergency power station of claim 3 wherein said engine operation circuit includes circuit means for manual operation of the engine.

5. The emergency power station of claim 3 wherein said engine operation circuit includes circuit means for periodic operation of the engine.

6. The emergency power station of claim 5 wherein said circuit means of said engine operation circuit includes programming means for setting the time of periodic operation of the engine.

7. The emergency power station of claim 1 wherein the control circuit of the power switch includes circuit means for delaying activation of the power switch after the power monitoring means senses a power loss.

8. The emergency power station of claim 2 wherein the control circuit of the power switch includes circuit means for delaying activation of the power switch after the power monitoring means senses a return of utility power.

9. The emergency power station of claim 1 wherein the control circuit includes programming means for programming the operation of the engine, generator and power switch according to a programmed protocol.

10. The emergency power station of claim 1 wherein the frame is encased in a tamper-proof cabinet.

11. The emergency power station of claim 10 wherein the compartments of the frame are stacked wherein the cabinet has a small footprint.

12. An emergency power station for supplying emergency power to a device that is powered by conventional utility power comprising:

an engine and an electrical power generator mechanically connected to the engine, a fuel supply connected to the engine, wherein fuel to power the engine is supplied from the fuel supply, a controller box having a power circuit and a controller circuit controlling the power circuit wherein the power circuit has a first power line connectable to the powered device, a second power line connectable to the utility power, a third power line connected to the power generator, and, a power switch unit for selectively connecting the power line connectable to the powered device to one of the power line connectable to the utility power and the power line connected to the power generator; and, wherein the controller circuit has sensing means for sensing a change in the state of utility power when the powered device is connected to the emergency power station and the emergency power station is connected to the utility power, and, delaying for a predetermined period of time, an automatic switch of the power switch unit.

13. The emergency power station of claim 12 wherein the controller circuit has circuit means for immediate switching of the power switch unit on sensing a change in the state of utility power.

14. The emergency power station of claim 12 wherein the controller circuit has circuit means for periodic operation of the engine.

15. The emergency power station of claim 14 wherein the circuit means for periodic operation of the engine includes circuit means for operation of the engine without switching the power switch unit.

16. The emergency power station of claim 12 wherein the power station is contained within a tamper-proof cabinet.

17. The emergency power station of claim 12 wherein the sensing means includes a programmable processor with means for varying the predetermined period of time of the delay.

18. The emergency power station of claim 12 wherein the controller circuit includes circuit means for manual test of the emergency power station operation including manual activation of emergency power.

19. The emergency power station of claim 14 wherein the circuit means for periodic operation of the engine includes a timer for periodic startup of the engine at pre-determined intervals.

20. The emergency power station of claim 12 comprising further, a battery and battery charging unit, wherein the battery charging unit has a charge regulation circuit for maintaining the charge of the battery.

* * * * *